United States Patent
Lee et al.

(10) Patent No.: US 11,120,570 B2
(45) Date of Patent: Sep. 14, 2021

(54) METHOD FOR OBTAINING ROAD MARKING DATA

(71) Applicant: HRG International Institute for Research & Innovation, Anhui (CN)

(72) Inventors: Hsiencheng Lee, Anhui (CN); Chenxu Jiang, Anhui (CN); Yuan Cao, Anhui (CN); Zhenzhong Yu, Anhui (CN); Liang Ding, Anhui (CN); Fuchen Zhao, Anhui (CN); Kerui Xia, Anhui (CN); Quan Wang, Anhui (CN); Long Guo, Anhui (CN)

(73) Assignee: HRG INTERNATIONAL INSTITUTE FOR RESEARCH & INNOVATION, Hefei (CN)

( * ) Notice: Subject to any disclaimer, the term of this patent is extended or adjusted under 35 U.S.C. 154(b) by 153 days.

(21) Appl. No.: 16/592,962

(22) Filed: Oct. 4, 2019

(65) Prior Publication Data

US 2020/0151897 A1  May 14, 2020

(30) Foreign Application Priority Data

Nov. 14, 2018 (CN) .......................... 201811353109.8

(51) Int. Cl.
  *G06K 9/00*  (2006.01)
  *G06T 7/70*  (2017.01)
  *G01C 21/32*  (2006.01)

(52) U.S. Cl.
  CPC ............... *G06T 7/70* (2017.01); *G01C 21/32* (2013.01); *G06K 9/0063* (2013.01); *G06T 2207/20172* (2013.01); *G06T 2207/30256* (2013.01)

(58) Field of Classification Search
  CPC combination set(s) only.
  See application file for complete search history.

(56) References Cited

U.S. PATENT DOCUMENTS

| | | | |
|---|---|---|---|
| 9,384,402 B1* | 7/2016 | Furman | H04N 19/117 |
| 2002/0081001 A1* | 6/2002 | Tsuji | G05D 1/0246 |
| | | | 382/104 |
| 2005/0060069 A1* | 3/2005 | Breed | B60N 2/2863 |
| | | | 701/408 |
| 2006/0015252 A1* | 1/2006 | Yamamoto | G01S 17/931 |
| | | | 701/301 |
| 2007/0014488 A1* | 1/2007 | Chen | G06T 7/33 |
| | | | 382/294 |

(Continued)

*Primary Examiner* — Shervin K Nakhjavan

(57) ABSTRACT

A method for obtaining road marking data and a device thereof are provided. The method includes steps of: obtaining coordinates of calibration references on a to-be-marked road; importing the coordinates of the calibration references into an electronic image of the to-be-marked road; determining, according to a difference between the coordinates of the calibration references and coordinates of to-be-calibrated points corresponding to the calibration references in a road image included in the electronic image, whether to perform a calibration on the coordinates of the to-be-calibrated points; and when the difference is greater than a threshold, performing the calibration on the coordinates of the to-be-calibrated points, and using calibrated coordinates of the to-be-calibrated points as road marking data. By applying the present disclosure, the accuracy of road marking data can be improved.

10 Claims, 4 Drawing Sheets

(56) References Cited

U.S. PATENT DOCUMENTS

| | | | |
|---|---|---|---|
| 2008/0317288 A1* | 12/2008 | Aoki | G06K 9/00798 |
| | | | 382/104 |
| 2009/0080697 A1* | 3/2009 | Kishikawa | G01C 15/00 |
| | | | 382/103 |
| 2010/0014712 A1* | 1/2010 | Sampedro Diaz | G01C 21/32 |
| | | | 382/104 |
| 2011/0115912 A1* | 5/2011 | Kuehnle | G06K 9/00798 |
| | | | 348/148 |
| 2019/0163992 A1* | 5/2019 | Mahon | G01J 1/44 |
| 2020/0182639 A1* | 6/2020 | Ho | G06Q 10/04 |

\* cited by examiner

METHOD FOR OBTAINING ROAD MARKING DATA

BACKGROUND OF THE INVENTION

Field of the Disclosure

The present disclosure relates to a method for obtaining data and a device thereof, and more particularly to a method for obtaining road marking data and a device thereof.

Description of Related Art

With the expansion of the construction of technical facilities in China, it is an imperative project to mark road lines for distinguishing road lanes when revamping existing roads and building new roads. At present, the most widely-used method is to mark road lines in an artificial manner, which needs to pre-measure the size of the to-be-marked road, draw a white marking line at the to-be-marked position, and then spray the road line by hand-push or vehicle-mounted drawing equipment. However, the process of drawing white marking lines requires two or three people to work on the road, which not only causes staff safety problems, but also slower the speed of drawing white marking lines. For a multi-lane road, each road line needs to be marked one by one.

According to current GPS navigation technology, it is found that there is currently a playing field marking car using GPS navigation. For example, when drawing lines of a football field, the line data for spraying the to-be-marked image on the football field can be calculated by computers based on the ratio of the football field to the to-be-marked image since the football field has a known size and a known shape. However, in practical applications, roads are twisted, and the curvature of each road is different, which is difficult to obtain accurate shape information of the roads. In addition, with the best satellite photography technology in the world, Goeye-1 satellite has a pixel resolution of only 0.4 meters. The satellite phots taken by spherical lens of cameras are curved. In the process of making satellite maps, arcs of satellite photos are calibrated through software operations, and then the calibrated satellite photos are spliced into satellite maps. Therefore, the best satellite map or the best aerial map still has offset and deformation, and cannot directly provide road marking accuracy. Hence, the technical problem of low accuracy of the road marking data is existed in the prior art.

SUMMARY OF THE INVENTION

In order to solve the above problems, it is an object of the present disclosure to provide a method for obtaining road marking data and a device thereof, which solves the technical problem of low accuracy of the road marking data in the prior art.

According to an exemplary embodiment, a method for obtaining road marking data is provided. The method includes steps of: obtaining coordinates of calibration references on a to-be-marked road; importing the coordinates of the calibration references into an electronic image of the to-be-marked road; determining, according to a difference between the coordinates of the calibration references and coordinates of to-be-calibrated points corresponding to the calibration references in a road image included in the electronic image, whether to perform a calibration on the coordinates of the to-be-calibrated points; and when the difference is greater than a threshold, performing the calibration on the coordinates of the to-be-calibrated points, and using calibrated coordinates of the to-be-calibrated points as road marking data.

In one embodiment, the method further includes the following step: when the difference is not greater than the threshold, obtaining coordinates of a road line of the to-be-marked road, and using the coordinates of the road line as the road marking data.

In one embodiment, the step of performing the calibration on the coordinates of the to-be-calibrated points further includes the following sub-steps: when a first calibration reference corresponding to a first to-be-calibrated point among the to-be-calibrated points on the to-be-marked road is acquired, obtaining a displacement vector between a coordinate of the first calibration reference and a coordinate of the first to-be-calibrated point; and regarding to each other to-be-calibrated coordinate point drawn on the road line on the electronic image, using a sum of the first to-be-calibrated point and the displacement vector as a calibrated coordinate of the first to-be-calibrated point.

In one embodiment, the step of performing the calibration on the coordinates of the to-be-calibrated points further includes the following sub-steps: when a first calibration reference and a second calibration reference corresponding to a first to-be-calibrated point and a second to-be-calibrated point among the to-be-calibrated points on the to-be-marked road are acquired, obtaining a reference road line composed of the first calibration reference and the second calibration reference; based on a to-be-calibrated road line formed by the first to-be-calibrated point and the second to-be-calibrated point, aligning the first to-be-calibrated point and the second to-be-calibrated point of the to-be-calibrated road line with the first calibration reference and the second calibration reference of the reference road line; and calibrating a coordinate of a third to-be-calibrated point located between the first to-be-calibrated point and the second to-be-calibrated point to a coordinate of a third calibration reference located between the first calibration reference and the second calibration reference.

In one embodiment, the method further includes the following step: performing an interpolation calibration on other coordinate points between two adjacent to-be-calibrated points.

In one embodiment, the interpolation calibration includes the following sub-steps: when the first to-be-calibrated point and the second to-be-calibrated point are located on a same side of a connecting line between the first calibration reference and the second calibration reference, obtaining a smaller difference value among a first difference value and a second difference value, wherein a length of the connecting line between the first calibration reference and the second calibration reference is L2, a difference value between the first calibration reference and the first to-be-calibrated point is the first difference value, and a difference value between the second calibration reference and the second to-be-calibrated point is the second difference value; regarding to a fourth to-be-calibrated point of the other to-be-calibrated points located between the first to-be-calibrated point and the second to-be-calibrated point, obtaining a fourth calibration reference corresponding to the smaller difference value, and obtaining a distance L1 between the coordinate of the fourth to-be-calibrated point and the fourth calibration reference corresponding to the smaller difference value; obtaining a ratio L1/L2 of the distance L1 and the length L2; obtaining a sum S1 of the first difference value and the second difference value; obtaining a desired offset of the coordinate of the fourth to-be-calibrated point according to a product of the sum S1 of the first difference value and the second difference and the ratio L1/L2; and performing a calibration on each point on the road line drawn on the electronic image according to the desired offset of the coordinate of the fourth to-be-calibrated point, the first difference value, and the second difference value.

In one embodiment, the interpolation calibration further includes the following sub-steps: when the first to-be-calibrated point and the second to-be-calibrated point are located on different sides of a connecting line between the first calibration reference and the second calibration reference, obtaining an intersection point between a first straight line and a second straight line, wherein a connecting line between the second to-be-calibrated point and the first to-be-calibrated point is the first straight line, and a connecting line between the first calibration reference and the first calibration reference is the second straight line; regarding to a fourth to-be-calibrated point of the other to-be-calibrated points located between the first to-be-calibrated point and the second to-be-calibrated point, obtaining a length L5 of a perpendicular line from the intersection point perpendicular to the connecting line of the fourth to-be-calibrated point and the fourth calibration reference, and obtaining a length L6 of a perpendicular line from the intersection point perpendicular to the connecting line of the first to-be-calibrated point and the first calibration reference; obtaining a ratio L6/L5 of the length L6 and the length L5, and obtaining a distance L7 between the first to-be-calibrated point and the first calibration reference; obtaining a desired offset of the coordinate of the fourth to-be-calibrated point according to a product of the ratio L6/L5 and the distance L7, wherein the first to-be-calibrated point and the fourth to-be-calibrated point are located on the same side of the connecting line between the first calibration reference and the second calibration reference; and performing a calibration on each point on the road line drawn on the electronic image according to the desired offset of the coordinate of the fourth to-be-calibrated point, the first difference value, and the second difference value.

In one embodiment, the method further includes the following steps: updating the road marking data to a coordinate navigation road marking device, so that the coordinate navigation road marking device draws a current road line according to the updated road marking data; performing a translation on the road marking data according to a predetermined spacing between two adjacent road lines to obtain a second road line parallel to the current road line.

In one embodiment, the calibration references include at least one of reference points, reference lines, and reference maps.

In one embodiment, the electronic image includes an electronic map, an aerial image, or and electronic road engineering drawing.

According to another exemplary embodiment, a device for obtaining road marking data is provided. The device includes an obtaining module, an importing module, a determining module, and a calibration module. The obtaining module is configured to obtain coordinates of calibration references on a to-be-marked road. The importing module is configured to import the coordinates of the calibration references into an electronic image of the to-be-marked road. The determining module is configured to determine, according to a difference between the coordinates of the calibration references and coordinates of to-be-calibrated points corresponding to the calibration references in a road image included in the electronic image, whether to perform a calibration on the coordinates of the to-be-calibrated points. The calibration module is configured to perform the calibration on the coordinates of the to-be-calibrated points, and using calibrated coordinates of the to-be-calibrated points as road marking data when the difference is greater than a threshold.

In one embodiment, the device further includes a setting module. The setting module is configured to obtain coordinates of a road line of the to-be-marked road, and use the coordinates of the road line as the road marking data when the difference is not greater than the threshold.

In one embodiment, the calibration module is further configured to: obtain a displacement vector between a coordinate of the first calibration reference and a coordinate of the first to-be-calibrated point when a first calibration reference corresponding to a first to-be-calibrated point among the to-be-calibrated points on the to-be-marked road is acquired; and regarding to each other to-be-calibrated coordinate point drawn on the road line on the electronic image, use a sum of the first to-be-calibrated point and the displacement vector as a calibrated coordinate of the first to-be-calibrated point.

In one embodiment, the calibration module is further configured to:

obtain a reference road line composed of the first calibration reference and the second calibration reference when a first calibration reference and a second calibration reference corresponding to a first to-be-calibrated point and a second to-be-calibrated point among the to-be-calibrated points on the to-be-marked road are acquired; align the first to-be-calibrated point and the second to-be-calibrated point of the to-be-calibrated road line with the first calibration reference and the second calibration reference of the reference road line based on a to-be-calibrated road line formed by the first to-be-calibrated point and the second to-be-calibrated point; calibrate a coordinate of a third to-be-calibrated point located between the first to-be-calibrated point and the second to-be-calibrated point to a coordinate of a third calibration reference located between the first calibration reference and the second calibration reference; and perform an interpolation calibration on other coordinate points between two adjacent to-be-calibrated points.

In one embodiment, the calibration module is further configured to: obtain a smaller difference value among a first difference value and a second difference value when the first to-be-calibrated point and the second to-be-calibrated point are located on a same side of a connecting line between the first calibration reference and the second calibration reference, wherein a length of the connecting line between the first calibration reference an the second calibration reference is L2, a difference value between the first calibration reference and the first to-be-calibrated point is the first difference value, and a difference value between the second calibration reference and the second to-be-calibrated point is the second difference value; regarding to a fourth to-be-calibrated point of the other to-be-calibrated points located between the first to-be-calibrated point and the second to-be-calibrated point, obtain a fourth calibration reference corresponding to the smaller difference value, and obtain a distance L1 between the coordinate of the fourth to-be-calibrated point and the fourth calibration reference corresponding to the smaller difference value; obtain a ratio L1/L2 of the distance L1 and the length L2; obtain a sum S1 of the first difference value and the second difference value; obtain a desired offset of the coordinate of the fourth to-be-calibrated point according to a product of the sum S1 of the first difference value and the second difference and the ratio L1/L2; and perform a calibration on each point on the road line drawn on the electronic image according to the desired offset of the coordinate of the fourth to-be-calibrated point, the first difference value, and the second difference value.

In one embodiment, the calibration module is further configured to: obtain an intersection point between a first straight line and a second straight line when the first to-be-calibrated point and the second to-be-calibrated point are located on different sides of a connecting line between the first calibration reference and the second calibration reference, wherein a connecting line between the second to-be-calibrated point and the first to-be-calibrated point is the first straight line, and a connecting line between the first calibration reference and the first calibration reference is the second straight line; regarding to a fourth to-be-calibrated point of the other to-be-calibrated points located between the first to-be-calibrated point and the second to-be-calibrated point, obtain a length L5 of a perpendicular line from the intersection point perpendicular to the connecting line of the fourth to-be-calibrated point and the fourth calibration reference, and obtain a length L6 of a perpendicular line from the intersection point perpendicular to the connecting line of the first to-be-calibrated point and the first calibration reference; obtain a ratio L6/L5 of the length L6 and the length L5, and obtain a distance L7 between the first to-be-calibrated point and the first calibration reference; obtain a desired offset of the coordinate of the fourth to-be-calibrated point according to a product of the ratio L6/L5 and the distance L7, wherein the first to-be-calibrated point and the fourth to-be-calibrated point are located on the same side of the connecting line between the first calibration reference and the second calibration reference; and perform a calibration on each point on the road line drawn on the electronic image according to the desired offset of the coordinate of the fourth to-be-calibrated point, the first difference value, and the second difference value.

In one embodiment, the device further includes an input module. The input module is configured to: update the road marking data to a coordinate navigation road marking device, so that the coordinate navigation road marking device draws a current road line according to the updated road marking data; perform a translation on the road marking data according to a predetermined spacing between two adjacent road lines to obtain a second road line parallel to the current road line.

In one embodiment, the calibration references include at least one of reference points, reference lines, and reference maps.

In one embodiment, the electronic image includes an electronic map, an aerial image, or and electronic road engineering drawing.

The present disclosure has the following advantages.

By applying the embodiment of the present disclosure, coordinates of calibration references are imported into the to-be-marked road of the electronic image, and then the to-be-calibrated points in the electronic image are calibrated according to the calibration references, thereby avoiding the accuracy issue of road marking data caused by inaccurate coordinates in the electronic image. Therefore, the embodiment of the present disclosure can improve the accuracy of the road marking data.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE INVENTION

Figure 1:
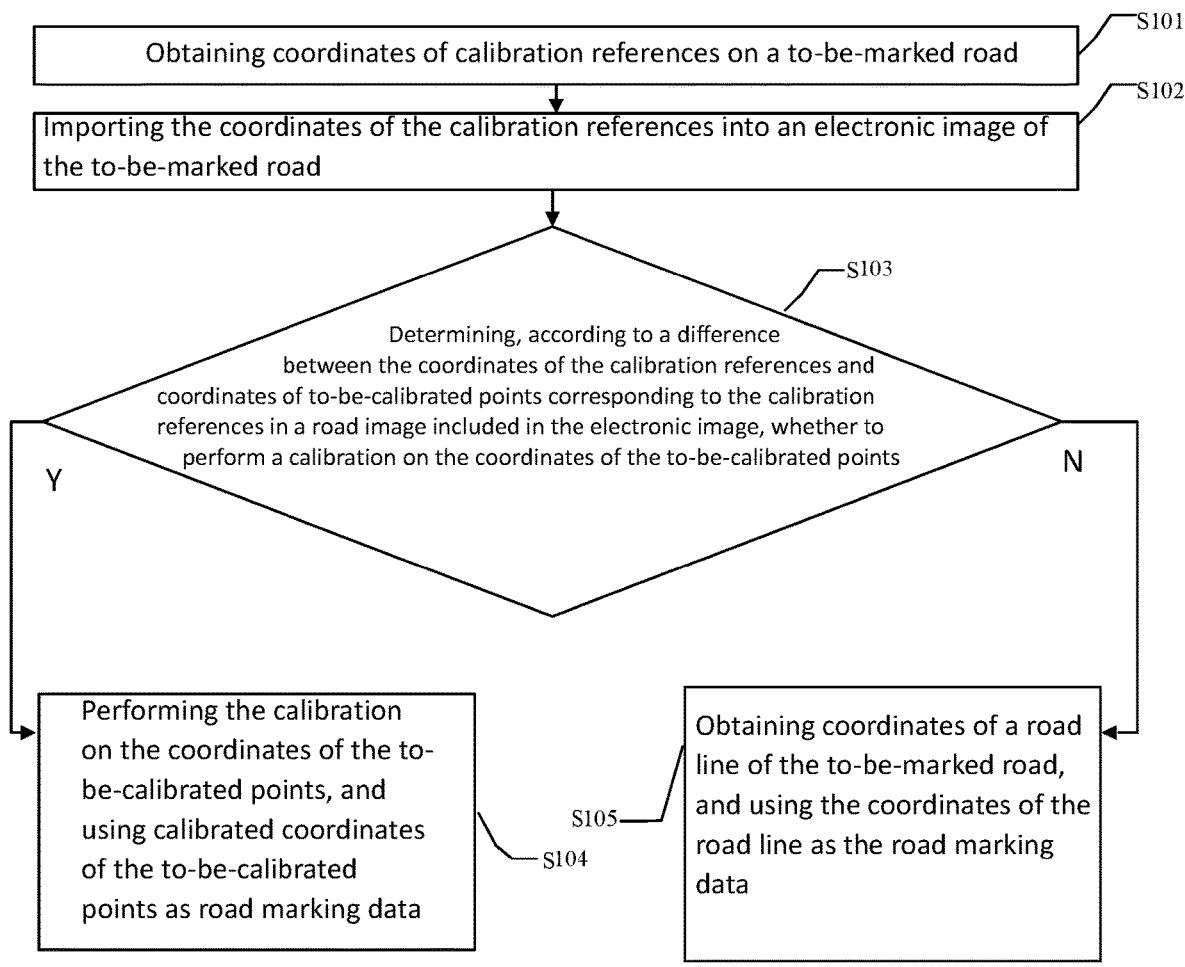
FIG. 1 is a flowchart of a method for obtaining road marking data according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A method for obtaining road marking data and a device thereof are provided in the embodiments of the present disclosure. The following is a description of a method for obtaining road marking data.

Please refer to FIG. 1. FIG. 1 is a flowchart of a method for obtaining road marking data according to an embodiment of the present disclosure. As shown in FIG. 1, the method includes the following steps.

Step S101: Obtaining coordinates of calibration references on a to-be-marked road.

In one embodiment, the calibration references may include at least one of reference points, reference lines, and reference maps. However, this is merely an example for explaining the present disclosure, and should not be a limitation of the present disclosure. In practical applications, the calibration references may include, but is not limited to, edges of to-be-marked roads, center lines, road lines, sidewalks or safety islands on the to-be-marked roads.

Specifically, the reference points may be a plurality of measurement points on the road obtained by the construction personnel. When detecting that the error between the satellite map and the actual position is a translation error or an offset error, a calibration may be performed on coordinates of the satellite map according to a difference between one reference point and its corresponding point on the satellite map. When the satellite map is deformed, at least three reference points are required for performing deformation calibration. By adopting the measurement reference point detection method, the construction workload can be reduced.

Reference lines: the accuracy is very good by adopting the measurement reference line detection method, although the construction workload is greatly increased. For example, the measurement reference lines can be directly used to create road line marking data.

The reference maps may be patterns on the road, such as a speed limit marker or a lane marking on the road, and the like.

The calibration references are the coordinate points obtained by the construction personnel at the construction site, wherein the locations of these coordinate points are correct and can be used as a construction basis.

Step S102: Importing the coordinates of the calibration references into an electronic image of the to-be-marked road.

In one embodiment, the electronic image may include an electronic map, an aerial image, or and electronic road engineering drawing. However, this is merely an example for explaining the present disclosure, and should not be a limitation of the present disclosure. In practical applications, the aerial image may be a photograph of a to-be-marked road taken by an aerial photography tool including, but not limited to, a satellite, an airplane, a remotely-piloted aircraft, a program-controlled aircraft, a hot air balloon, a parasol, or the like.

Step S103: Determining, according to a difference between the coordinates of the calibration references and coordinates of to-be-calibrated points corresponding to the calibration references in a road image included in the electronic image, whether to perform a calibration on the coordinates of the to-be-calibrated points.

Determining whether the imported calibration references coincide with the corresponding points on the road in the electronic image or the error between them is less than a predetermined range. If yes, the calibration is required, and step S104 is performed; if no, the calibration is not required, and step S105 is performed.

Step S104: When the difference is greater than a threshold, performing the calibration on the coordinates of the to-be-calibrated points, and using calibrated coordinates of the to-be-calibrated points as road marking data.

(1) When a first calibration reference corresponding to a first to-be-calibrated point on the to-be-marked road is acquired, a displacement vector between a coordinate of the first calibration reference and a coordinate of the first to-be-calibrated point is obtained. Regarding to each other to-be-calibrated coordinate point drawn on the road line on the electronic image, a sum of the first to-be-calibrated point and the displacement vector is used as a calibrated coordinate of the first to-be-calibrated point.

In practical applications, the calibration reference obtained on the to-be-marked road is point A, and its coordinate is (Xa, Ya). The to-be-calibrated point B corresponding the calibration reference point A on the road line drawn in step S102 has a coordinate (Xb, Yb). The displacement vector of the to-be-calibrated point B deviated from the calibration reference point A is (Xa-Xb, Ya-Yb).

After that, regarding to each to-be-calibrated point on the road line drawn in step S102, the sum of the coordinate of the to-be-calibrated point and the displacement vector is used for calculating the calibrated coordinate of the to-be-calibrated point.

The coordinates of all points on the road line can be calibrated based on the method described above.

It can be understood that, the method is more suitable for the condition that there is an overall translation on the road to-be-marked.

(2) When at least a first calibration reference and a second calibration reference corresponding to a first to-be-calibrated point and a second to-be-calibrated point on the to-be-marked road are acquired, a reference road line composed of the first calibration reference and the second calibration reference is obtained. Based on a to-be-calibrated road line formed by the first to-be-calibrated point and the second to-be-calibrated point, the first to-be-calibrated point and the second to-be-calibrated point of the to-be-calibrated road line are aligned with the first calibration reference and the second calibration reference of the reference road line. A coordinate of a third to-be-calibrated point located between the first to-be-calibrated point and the second to-be-calibrated point is calibrated to a coordinate of a third calibration reference located between the first calibration reference and the second calibration reference. After that, an interpolation calibration is performed on other coordinate points between two adjacent to-be-calibrated points.

Figure 2:
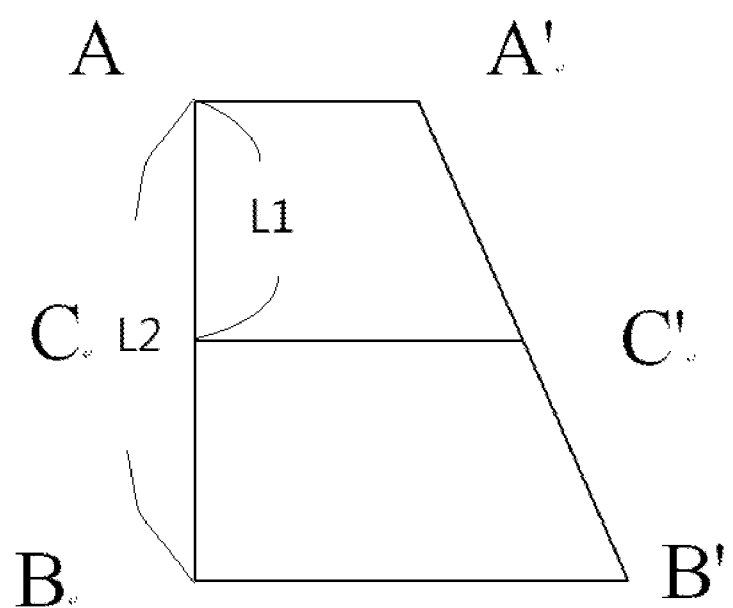
FIG. 2 is a schematic diagram of a coordinate calibration according to a first embodiment of the present disclosure.

Please also refer to FIG. 2. In a first embodiment, when the first to-be-calibrated point A' and the second to-be-calibrated point B' are located on the same side of a connecting line between the first calibration reference A and the second calibration reference B, the interpolation calibration may include the following sub-steps.

(S11) When the first to-be-calibrated point A' and the second to-be-calibrated point B' are located on the same side of a connecting line between the first calibration reference A and the second calibration reference B, a smaller difference value among a first difference value and a second difference value is obtained, wherein a length of the connecting line between the first calibration reference A and the second calibration reference B is L2. The difference value between the first calibration reference A and the first to-be-calibrated point A' is the first difference value Sa, and the difference value between the second calibration reference B and the second to-be-calibrated point B' is the second difference value Sb.

(S12) Regarding to a fourth to-be-calibrated point C' of the other to-be-calibrated points located between the first to-be-calibrated point A' and the second to-be-calibrated point B', a fourth calibration reference C corresponding to the smaller difference value is obtained, and a distance L1 between the coordinate of the fourth to-be-calibrated point C' and the fourth calibration reference C corresponding to the smaller difference value is obtained.

(S13) A ratio L1/L2 of the distance L1 and the length L2 is obtained.

(S14) A sum S1 of the first difference value Sa and the second difference value Sb is obtained.

(S15) A desired offset of the coordinate of the fourth to-be-calibrated point C' is obtained according to a product of the sum S1 of the first difference value and the second difference and the ratio L1/L2.

(S16) A calibration is performed on each point on the road line drawn on the electronic image according to the desired offset of the coordinate of the fourth to-be-calibrated point C', the first difference value Sa, and the second difference value Sb.

Figure 3:
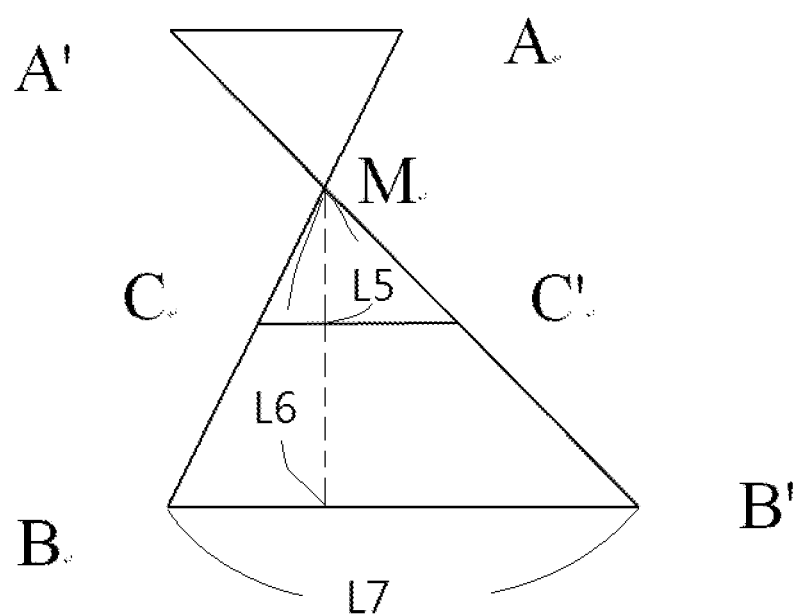
FIG. 3 is a schematic diagram of a coordinate calibration according to a second embodiment of the present disclosure.

Please also refer to FIG. 3. In a second embodiment, when the first to-be-calibrated point A' and the second to-be-calibrated point B' are located on different sides of a connecting line between the first calibration reference A and the second calibration reference B, the interpolation calibration may include the following sub-steps.

(S21) When the first to-be-calibrated point B' and the second to-be-calibrated point A' are located on different sides of a connecting line between the first calibration reference B and the second calibration reference A, an intersection point M between a first straight line and a second straight line is obtained. The connecting line between the second to-be-calibrated point A' and the first to-be-calibrated point B' is a first straight line, and the connecting line between the first calibration reference B and the first calibration reference A is the second straight line.

(S22) Regarding to a fourth to-be-calibrated point C' of the other to-be-calibrated points located between the first to-be-calibrated point B' and the second to-be-calibrated point A', a length L5 of a perpendicular line from the intersection point M perpendicular to the connecting line CC' is obtained, and a length L6 of a perpendicular line from the intersection point M perpendicular to the connecting line BB' is obtained.

(S23) A ratio L6/L5 of the length L6 and the length L5 is obtained, and a distance L7 between the first to-be-calibrated point B' and the first calibration reference B is obtained.

(S24) A desired offset of the coordinate of the fourth to-be-calibrated point C' is obtained according to a product of the ratio L6/L5 and a distance L7 of a connecting line between the first to-be-calibrated point B' and the first calibration reference B, wherein the first to-be-calibrated point B' and the fourth to-be-calibrated point C' are located on the same side of the connecting line between the first calibration reference B and the second calibration reference A.

(S25) A calibration is performed on each point on the road line drawn on the electronic image according to the desired offset of the coordinate of the fourth to-be-calibrated point C', the first difference value, and the second difference value.

Specifically, a predetermined point on the aerial image may be used as a start point, a road line is drawn on the aerial image, and coordinates of each to-be-calibrated point on the road line are obtained.

In practical applications, a road line can be drawn on the to-be-marked road by manually controlling a mouse or drawing software. For example, an image detection algorithm can be used to detect a road edge of the to-be-marked road, and a road line can be drawn on the road edge. In another embodiment, the image detection algorithm can also be used to detect a road center line of the to-be-marked road, and a road line can be drawn on the road center line. In another embodiment, the image detection algorithm can also be used to detect a road edge of the to-be-marked road, a distance (such as a lane width) from the road edge is set, and a road line can be drawn on the position of the lane width depart from the road edge. In another embodiment, an image recognition algorithm can be used to identify the position of the original road line on the to-be-marked road, and then the road line is re-rendered on the aerial image based on the position of the original road line. In another embodiment, the image recognition algorithm can also be used to identify the road width or the image of the to-be-marked road to obtain the road center line of the to-be-marked road, and then the road line can be drawn according to the road center line.

It should be emphasized that the obtained road line on the to-be-marked road is the road line formed by the to-be-calibrated points. The embodiments of the present disclosure do not limit the method for obtaining the road line, and any method for obtaining the road line is within the scope of protection of the present disclosure.

Please refer to FIG. 2. FIG. 2 is a schematic diagram of a coordinate calibration according to a first embodiment of the present disclosure. As shown in FIG. 2, the point A represents the first calibration reference, the point B represents the second calibration reference, the point A' represents the first to-be-calibrated point, and the point B' represents the second to-be-calibrated point. The coordinate point C' represents one of the other to-be-calibrated points located between the first to-be-calibrated point A' and the second to-be-calibrated point B'.

The first difference value between the first calibration reference A and the first to-be-calibrated point A' is represented by Sa, and the second difference value between the second calibration reference B and the second to-be-calibrated point B' is represented by Sb. In the case where the first difference value Sa is smaller than the second difference value Sb, Sa is viewed as the smaller difference value among the first difference value Sa and the second difference value Sb. The sum of the first difference value Sa and the second difference value Sb is S1.

Taking the fourth to-be-calibrated point C' as an example, the distance between the first calibration reference A and the fourth calibration reference C is L1. The distance between the first calibration reference A and the second calibration reference B is L2. The desired offset of the fourth to-be-calibrated point C' is: (L1/L2)*S1.

Please refer to FIG. 3. FIG. 3 is a schematic diagram of a coordinate calibration according to a second embodiment of the present disclosure. As shown in FIG. 3, the point B represents the first calibration reference, the point A represents the second calibration reference, the point B' represents the first to-be-calibrated point, and the point A' represents the second to-be-calibrated point. The coordinate point C' represents one of the other to-be-calibrated points located between the first to-be-calibrated point B' and the second to-be-calibrated point A'.

Taking the fourth to-be-calibrated point C' as an example, the connecting line between the second to-be-calibrated point A' and the first to-be-calibrated point B' is a first straight line A'B', the connecting line between the first calibration reference B and the first calibration reference A is a second straight line AB, and the point M is the intersection point of the first straight line and the second straight line.

The connecting line between the fourth to-be-calibrated point C' and the second straight line is CC'. The length of the perpendicular line from the intersection point M perpendicular to the connecting line CC' is L5, and the length of the perpendicular line from the intersection point M perpendicular to the connecting line BB' is L6.

The distance between the first to-be-calibrated point B' and the first calibration length B is L7. The desired offset of the fourth to-be-calibrated point C' is: (L5/L6)*L7.

It should be noted that the connecting lines CC', AA', and BB' are parallel.

In order to further improve the calibration accuracy, the coordinates of other to-be-calibrated points located between the first to-be-calibrated point and the second to-be-calibrated point corresponding to the first calibration reference and the second calibration reference may be calibrated according to the coordinates of the first calibration reference and the second calibration reference.

It can be understood that, when the number of to-be-calibrated points is 3 or more, a calibration can be performed on the to-be-calibrated points located on two ends of the obtained road line first, and then other to-be-calibrated points located between the two ends can be calibrated. Finally, the coordinate points of the to-be-calibrated road line between the two adjacent to-be-calibrated points can be calibrated according to the method of this step.

Alternatively, starting from one end of the road line, the coordinates of the adjacent two to-be-calibrated points can be calibrated one by one until the coordinates of all the to-be-calibrated points are calibrated. Finally, the coordinate points of the road line between the two adjacent to-be-calibrated points can be calibrated according to the method of this step.

It should be emphasized that, the embodiment of the present disclosure does not limit the calibration sequence of the to-be-calibrated points Step S105: When the difference is not greater than the threshold, obtaining coordinates of a road line of the to-be-marked road, and using the coordinates of the road line as the road marking data.

In a specific application scenario of the prior art, such as in the marking field of GPS navigation technology football field/stadium, based on the size and the shape of the football field/stadium, the pattern formed by the drawn lines is enlarged or reduced according to a ratio of the pattern to the football field/stadium. The coordinates of each point on the group are obtained according to the coordinates of reference points of the football field/stadium, thereby implementing marking. However, in the road marking field, since the curvature of the road changes with the extension of the distance, the curvature of the to-be-marked road line is also constantly changing, and the shape of the to-be-marked road line is uncertain. It is impossible to perform a shape match on the road line and the road, and it is impossible to scale by drawing the lines and the road shape to implement drawing.

In another specific application scenario of the prior art, such as tractor control in the field of precision agriculture, GPS navigation is also used for performing trajectory control. First, a farm land basically has a known shape and a known size. The tractor calculates the spacing width between paths according to the agricultural machine of known width, and then acquires the GPS coordinates of each point on the path to make the tractor perform the trajectory control Take the field marking device and the farm tractor as examples, both belong to path planning of known image on the know site, wherein path calibration is not required. However, the length and the curvature of each road are different, which belongs to an unknown image. In the embodiments of the present disclosure, the electronic map is used to provide a relatively correct shape ratio of the road line, and precise positions are provided by calibration references of actual road measurement. A comparison and a calibration are performed on the shape ratio of the road line and the precise positions to obtain accurate road marking data. They have different concepts of obtaining path data, wherein the former is the inside image concept (i.e., a known image is inputted), while the latter is the outside image concept (i.e., an unknown image is outputted). By adding calibration technique, accurate road marking data can be obtained.

In practical applications, the coordinates of the embodiments of the present disclosure include, but are not limited to, GPS system coordinates and spherical coordinate, etc., which may be any identification manner for uniquely identifying locations of calibration references or to-be-calibrated points on the road.

By applying the embodiment shown in FIG. 1 of the present disclosure, the coordinates of the calibration references are imported into the to-be-marked road of the electronic image, and then the to-be-calibrated points in the electronic image are calibrated according to the calibration references, thereby avoiding the accuracy issue of road marking data caused by inaccurate coordinates in the electronic image. Therefore, the embodiment of the present disclosure can improve the accuracy of the road marking data.

Due to the limitation of the curvature of the earth, a certain spherical aberration will occur at edges of the aerial image. Therefore, the existing aerial image is obtained by cutting out the edges of a plurality of original aerial images, and then splicing the plurality of cut original aerial images. Even so, the aerial image still has a certain deformation at the splicing positions, which results in the difference between the coordinates obtained from the aerial image and the actual coordinates. Especially in the case where the aerial image has a large scale, the spherical aberration of the aerial image is severely serious. By applying the calibration of the calibration references in the embodiments of the present disclosure, coordinate calibration can be performed on the road line drawn on the aerial image having the spherical aberration, especially in the case where the aerial image has a large scale.

In a specific implementation of the present disclosure, the method may further include the following steps on the basis of the embodiment shown in FIG. 1: updating the road marking data to a coordinate navigation road marking device, so that the coordinate navigation road marking device draws a current road line according to the updated road marking data; and performing a translation on the road marking data according to a predetermined spacing between two adjacent road lines to obtain a second road line parallel to the current road line.

Specially, the road marking data obtained by the embodiment of the present disclosure can be used to update to a road marking equipment with GPS navigation, and the road marking equipment automatically draws lines according to each coordinate in the road marking data.

Since road lines on the same road are parallel to each other, after a first road line is drawn, the coordinates of the first road line can be translated according to a lane width to obtain coordinates of another adjacent road line. Then, the adjacent road line can be drawn.

It should be emphasized that the device that performs the translation processing on the coordinates of the completed first road line according to the lane width may be a road marking data obtaining device or a coordinate navigation road marking device.

By applying the above-mentioned embodiments of the present disclosure, the coordinates of all road lines of the entire road can be quickly obtained when only the coordinates of one road line are obtained, thereby improving the marking efficiency of the road line.

In a specific implementation of the present disclosure, the method may further include the following steps on the basis of the embodiment shown in FIG. 1: identifying intersections of the to-be-marked roads, and spraying zebra crossing lines at a certain distance from the intersection.

By applying the above embodiment of the present disclosure, zebra crossing lines near the intersection can be drawn.

In accordance with the embodiment shown in FIG. 1 of the present disclosure, a device for obtaining road marking data is further provided according to one embodiment of the present disclosure.

Figure 4:
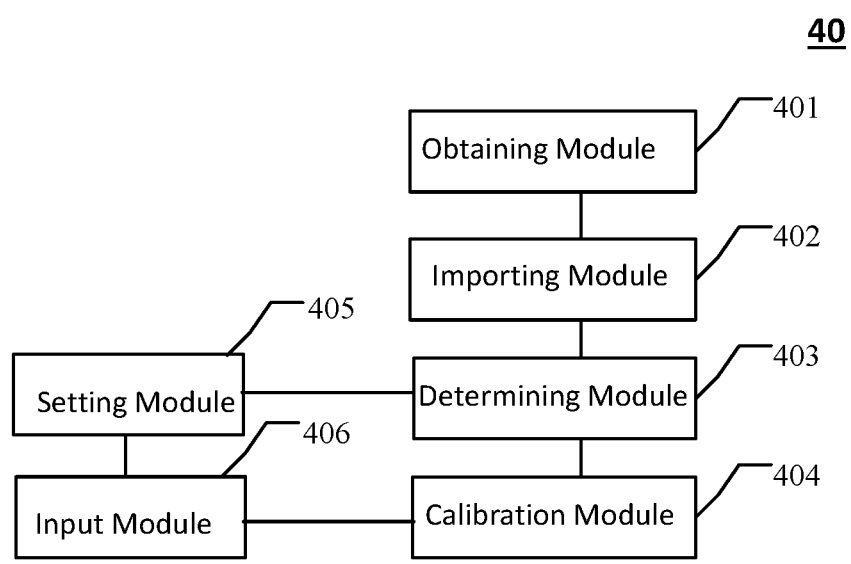
FIG. 4 is a block diagram of a device for obtaining road marking data according to an embodiment of the present disclosure.

Please refer to FIG. 4. FIG. 4 is a block diagram of a device for obtaining road marking data according to an embodiment of the present disclosure. As shown in FIG. 4, the device 40 includes, but is not limited to, an obtaining module 401, an importing module 402, a determining module 403, a calibration module 404, and a setting module 405. In one embodiment, the device 40 may further include an input module 406.

The obtaining module 401 is configured to obtain coordinates of calibration references on a to-be-marked road. In one embodiment, the calibration references may include at least one of reference points, reference lines, and reference maps. However, this is merely an example for explaining the present disclosure, and should not be a limitation of the present disclosure.

The importing module 402 is configured to obtain coordinates of calibration references on a to-be-marked road. In one embodiment, the electronic image may include an electronic map, an aerial image, or and electronic road engineering drawing. However, this is merely an example for explaining the present disclosure, and should not be a limitation of the present disclosure.

The determining module 403 is configured to determine, according to a difference between the coordinates of the calibration references and coordinates of to-be-calibrated points corresponding to the calibration references in a road image included in the electronic image, whether to perform a calibration on the coordinates of the to-be-calibrated points.

The calibration module 404 is configured to perform the calibration on the coordinates of the to-be-calibrated points, and use calibrated coordinates of the to-be-calibrated points as road marking data when the difference is greater than a threshold.

The setting module 405 is configured to obtain coordinates of a road line of the to-be-marked road, and use the coordinates of the road line as the road marking data when the difference is not greater than the threshold.

By applying the embodiment shown in FIG. 4 of the present disclosure, coordinates of calibration references are imported into the to-be-marked road of the electronic image, and then the to-be-calibrated points in the electronic image are calibrated according to the calibration references, thereby avoiding the accuracy issue of road marking data caused by inaccurate coordinates in the electronic image. Therefore, the embodiment of the present disclosure can improve the accuracy of the road marking data.

In a specific implementation of the present disclosure, the calibration module 404 is further configured to: obtain a displacement vector between a coordinate of the first calibration reference and a coordinate of the first to-be-calibrated point when a first calibration reference corresponding to a first to-be-calibrated point among the to-be-calibrated points on the to-be-marked road is acquired; and regarding to each other to-be-calibrated coordinate point drawn on the road line on the electronic image, use a sum of the first to-be-calibrated point and the displacement vector as a calibrated coordinate of the first to-be-calibrated point.

In a specific implementation of the present disclosure, the calibration module 404 is further configured to: obtain a reference road line composed of the first calibration reference and the second calibration reference when a first calibration reference and a second calibration reference corresponding to a first to-be-calibrated point and a second to-be-calibrated point among the to-be-calibrated points on the to-be-marked road are acquired; align the first to-be-calibrated point and the second to-be-calibrated point of the to-be-calibrated road line with the first calibration reference and the second calibration reference of the reference road line based on a to-be-calibrated road line formed by the first to-be-calibrated point and the second to-be-calibrated point; calibrate a coordinate of a third to-be-calibrated point located between the first to-be-calibrated point and the second to-be-calibrated point to a coordinate of a third calibration reference located between the first calibration reference and the second calibration reference; and perform an interpolation calibration on other coordinate points between two adjacent to-be-calibrated points.

In a specific implementation of the present disclosure, the calibration module 404 is further configured to: obtain a smaller difference value among a first difference value and a second difference value when the first to-be-calibrated point and the second to-be-calibrated point are located on a same side of a connecting line between the first calibration reference and the second calibration reference, wherein a length of the connecting line between the first calibration reference an the second calibration reference is L2, a difference value between the first calibration reference and the first to-be-calibrated point is the first difference value, and a difference value between the second calibration reference and the second to-be-calibrated point is the second difference value; regarding to a fourth to-be-calibrated point of the other to-be-calibrated points located between the first to-be-calibrated point and the second to-be-calibrated point, obtain a fourth calibration reference corresponding to the smaller difference value, and obtain a distance L1 between the coordinate of the fourth to-be-calibrated point and the fourth calibration reference corresponding to the smaller difference value; obtain a ratio L1/L2 of the distance L1 and the length L2; obtain a sum S1 of the first difference value and the second difference value; obtain a desired offset of the coordinate of the fourth to-be-calibrated point according to a product of the sum S1 of the first difference value and the second difference and the ratio L1/L2; and perform a calibration on each point on the road line drawn on the electronic image according to the desired offset of the coordinate of the fourth to-be-calibrated point, the first difference value, and the second difference value.

In a specific implementation of the present disclosure, the calibration module 404 is further configured to: obtain an intersection point between a first straight line and a second straight line when the first to-be-calibrated point and the second to-be-calibrated point are located on different sides of a connecting line between the first calibration reference and the second calibration reference, wherein a connecting line between the second to-be-calibrated point and the first to-be-calibrated point is the first straight line, and a connecting line between the first calibration reference and the first calibration reference is the second straight line; regarding to a fourth to-be-calibrated point of the other to-be-calibrated points located between the first to-be-calibrated point and the second to-be-calibrated point, obtain a length L5 of a perpendicular line from the intersection point perpendicular to the connecting line of the fourth to-be-calibrated point and the fourth calibration reference, and obtain a length L6 of a perpendicular line from the intersection point perpendicular to the connecting line of the first to-be-calibrated point and the first calibration reference; obtain a ratio L6/L5 of the length L6 and the length L5, and obtain a distance L7 between the first to-be-calibrated point and the first calibration reference; obtain a desired offset of the coordinate of the fourth to-be-calibrated point according to a product of the ratio L6/L5 and the distance L7, wherein the first to-be-calibrated point and the fourth to-be-calibrated point are located on the same side of the connecting line between the first calibration reference and the second calibration reference; and perform a calibration on each point on the road line drawn on the electronic image according to the desired offset of the coordinate of the fourth to-be-calibrated point, the first difference value, and the second difference value.

The input module 406 is configured to: update the road marking data to a coordinate navigation road marking device, so that the coordinate navigation road marking device draws a current road line according to the updated road marking data; perform a translation on the road marking data according to a predetermined spacing between two adjacent road lines to obtain a second road line parallel to the current road line.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for obtaining road marking data, comprising:
    obtaining coordinates of calibration references on a to-be-marked road;
    importing the coordinates of the calibration references into an electronic image of the to-be-marked road;
    determining, according to a difference between the coordinates of the calibration references and coordinates of to-be-calibrated points corresponding to the calibration references in a road image included in the electronic image, whether to perform a calibration on the coordinates of the to-be-calibrated points; and
    when the difference is greater than a threshold, performing the calibration on the coordinates of the to-be-calibrated points, and using calibrated coordinates of the to-be-calibrated points as road marking data.

2. The method for obtaining road marking data in claim 1, further comprising:
    when the difference is not greater than the threshold, obtaining coordinates of a road line of the to-be-marked road, and using the coordinates of the road line as the road marking data.

3. The method for obtaining road marking data in claim 2, wherein the step of performing the calibration on the coordinates of the to-be-calibrated points further comprises:
    when a first calibration reference corresponding to a first to-be-calibrated point among the to-be-calibrated points on the to-be-marked road is acquired, obtaining a displacement vector between a coordinate of the first calibration reference and a coordinate of the first to-be-calibrated point; and
    regarding to each other to-be-calibrated coordinate point drawn on the road line on the electronic image, using a sum of the first to-be-calibrated point and the displacement vector as a calibrated coordinate of the first to-be-calibrated point.

4. The method for obtaining road marking data in claim 2, wherein the step of performing the calibration on the coordinates of the to-be-calibrated points further comprises:
    when a first calibration reference and a second calibration reference corresponding to a first to-be-calibrated point and a second to-be-calibrated point among the to-be-calibrated points on the to-be-marked road are acquired, obtaining a reference road line composed of the first calibration reference and the second calibration reference;
    based on a to-be-calibrated road line formed by the first to-be-calibrated point and the second to-be-calibrated point, aligning the first to-be-calibrated point and the second to-be-calibrated point of the to-be-calibrated road line with the first calibration reference and the second calibration reference of the reference road line; and
    calibrating a coordinate of a third to-be-calibrated point located between the first to-be-calibrated point and the second to-be-calibrated point to a coordinate of a third calibration reference located between the first calibration reference and the second calibration reference.

5. The method for obtaining road marking data in claim 4, further comprising:
    performing an interpolation calibration on other coordinate points between two adjacent to-be-calibrated points.

6. The method for obtaining road marking data in claim 5, wherein the interpolation calibration comprises:
    when the first to-be-calibrated point and the second to-be-calibrated point are located on a same side of a connecting line between the first calibration reference and the second calibration reference, obtaining a smaller difference value among a first difference value and a second difference value, wherein a length of the connecting line between the first calibration reference and the second calibration reference is L2, a difference value between the first calibration reference and the first to-be-calibrated point is the first difference value, and a difference value between the second calibration reference and the second to-be-calibrated point is the second difference value;
    regarding to a fourth to-be-calibrated point of the other to-be-calibrated points located between the first to-be-calibrated point and the second to-be-calibrated point, obtaining a fourth calibration reference corresponding to the smaller difference value, and obtaining a distance L1 between the coordinate of the fourth to-be-calibrated point and the fourth calibration reference corresponding to the smaller difference value;
    obtaining a ratio L1/L2 of the distance L1 and the length L2;
    obtaining a sum S1 of the first difference value and the second difference value;
    obtaining a desired offset of the coordinate of the fourth to-be-calibrated point according to a product of the sum S1 of the first difference value and the second difference and the ratio L1/L2; and
    performing a calibration on each point on the road line drawn on the electronic image according to the desired offset of the coordinate of the fourth to-be-calibrated point, the first difference value, and the second difference value.

7. The method for obtaining road marking data in claim 5, wherein the interpolation calibration comprises:

when the first to-be-calibrated point and the second to-be-calibrated point are located on different sides of a connecting line between the first calibration reference and the second calibration reference, obtaining an intersection point between a first straight line and a second straight line, wherein a connecting line between the second to-be-calibrated point and the first to-be-calibrated point is the first straight line, and a connecting line between the first calibration reference and the first calibration reference is the second straight line;

regarding to a fourth to-be-calibrated point of the other to-be-calibrated points located between the first to-be-calibrated point and the second to-be-calibrated point, obtaining a length L5 of a perpendicular line from the intersection point perpendicular to the connecting line of the fourth to-be-calibrated point and the fourth calibration reference, and obtaining a length L6 of a perpendicular line from the intersection point perpendicular to the connecting line of the first to-be-calibrated point and the first calibration reference;

obtaining a ratio L6/L5 of the length L6 and the length L5, and obtaining a distance L7 between the first to-be-calibrated point and the first calibration reference;

obtaining a desired offset of the coordinate of the fourth to-be-calibrated point according to a product of the ratio L6/L5 and the distance L7, wherein the first to-be-calibrated point and the fourth to-be-calibrated point are located on the same side of the connecting line between the first calibration reference and the second calibration reference; and performing a calibration on each point on the road line drawn on the electronic image according to the desired offset of the coordinate of the fourth to-be-calibrated point, the first difference value, and the second difference value.

8. The method for obtaining road marking data in claim 2, further comprising:

updating the road marking data to a coordinate navigation road marking device, so that the coordinate navigation road marking device draws a current road line according to the updated road marking data;

performing a translation on the road marking data according to a predetermined spacing between two adjacent road lines to obtain a second road line parallel to the current road line.

9. The method for obtaining road marking data in claim 1, wherein the calibration references comprise at least one of reference points, reference lines, and reference maps.

10. The method for obtaining road marking data in claim 1, wherein the electronic image comprises an electronic map, an aerial image, or and electronic road engineering drawing.

* * * * *